Nov. 23, 1926. 1,608,393
A. E. HENDERSON
PROCESS OF MANUFACTURING SHEET RUBBER ARTICLES
Filed March 21, 1919
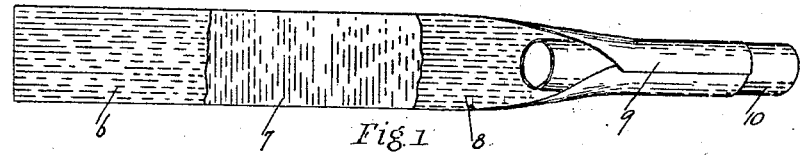
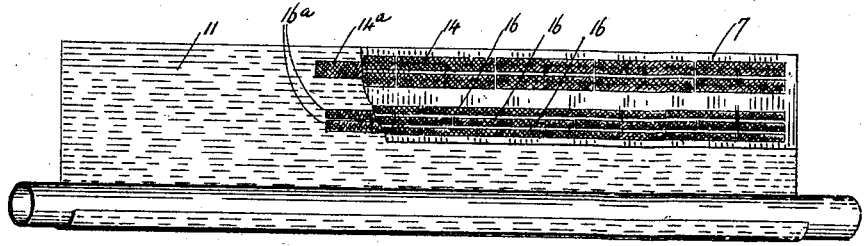
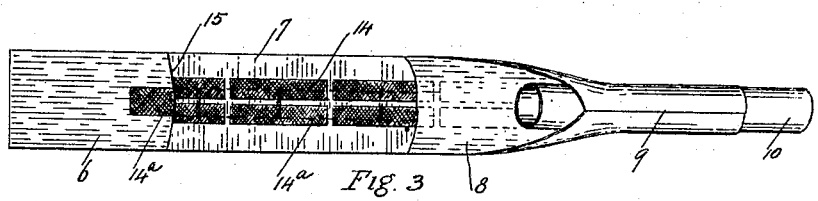
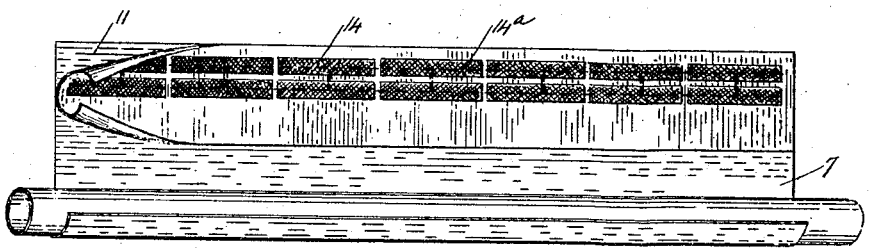
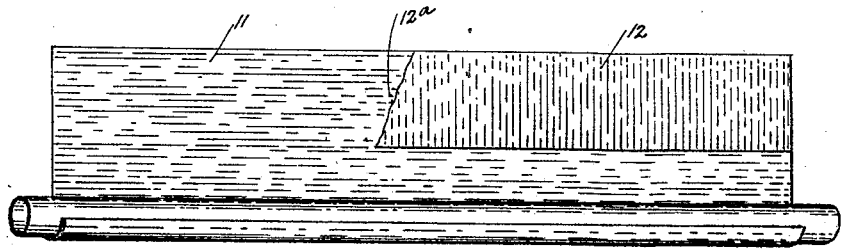

Patented Nov. 23, 1926.

1,608,393

UNITED STATES PATENT OFFICE.

ALBERT ENNIS HENDERSON, OF TORONTO, ONTARIO, CANADA.

PROCESS OF MANUFACTURING SHEET-RUBBER ARTICLES.

Application filed March 21, 1919. Serial No. 284,201.

The object of the invention is to provide a rubber sheet of composite or laminated structure and a method of producing the same, said sheet being adapted for use in the manufacture of pneumatic and other tubes and other hollow and similar articles which are subjected in use to internal or expensive strains applied in different directions to and in the plane of the sheet or the wall of the article, for the purpose of affording an equalized or uniform elastic resistance and mutual reinforcement between the lamina as a means not only of securing increased durability but of attaining results which are more definitely calculable in advance.

My invention relates more specifically to improvements in the method of arranging the layers of rubber which constitute the body of the tube in their relation to each other.

It is a well known fact that unvulcanized rubber sheet upon having passed through the calender possesses a distinct character longitudinally of the sheet differing materially from the transverse characteristics of the goods.

In the manufacture of tubes as they are produced at present the rubber is rolled on the pole lengthwise of the sheet and the body of the tube consists of several layers of lamina of rubber, wherein the longitudinal characteristics due to what may for convenience and lack of better term be designated as the "grain" coincide or run in the same direction.

One readily recognizable characteristic of the rubber is that when stretched or strained longitudinally of or parallel with what is herein called the grain, it offers more pronounced qualities of elasticity and strength than when stretched or strained transversely or substantially at right angles to the grain, and moreover the splitting of a rubber sheet or article constructed therefrom is parallel with this grain, showing that molecularly there is a difference in a structure or arrangement considered comparatively on longitudinal and transverse lines.

In the process herein set forth, it is proposed to manufacture the tube or other object in such a manner as to provide a composite laminated construction by varying the angular relations of the grain of the several layers of the rubber of the tube, placing them at right angles, or in other positions with reference to each other, to thus obtain the real and joint advantages of both the longitudinal and lateral characteristics of the rubber in the body of the tube along lines which are comparable at least in a sense with those which are apparent in the formation of laminated veneer in wood working and in composite stock used in the formation of thin scrolls, wherein, however, the strains are mainly, if not entirely, transverse or in the direction of breaking as distinguished from the tensile strains to which the material of rubber articles is exposed.

The essential objects of my invention therefore are:

First. To provide a composite or laminated tube in which the grain of the several layers of the rubber is in intersecting or overlapping angular relation.

Second. To ensure the non-separation of fabric inserts by having every strip or portion of embedded fabric in contact with the grain of the rubber running in different directions.

Third. To provide a simple method of securing the desired result.

A practical embodiment of the process is graphically illustrated in the accompanying drawings, in which, Figure 1 is a plan view, having portions cut away to show the relations of the layers of rubber to each other in one form, and the direction of the grain as used where the whole thickness of the tube material is wrapped around the pole in one turn.

Figure 2 shows the position of the rubber layers where the pole is rolled from the side to form a three ply tube.

Figure 3 is a plain view having parts cut away to show the manner of inserting fabric on the rim side of the tube in one single roll.

Figure 4 shows the same process by rolling the pole from the side.

Figure 5 shows the method of inserting fabric with the laminated construction when it is used on both tread and rim side as in a puncture proof tube, the same being formed by two turns of the pole and forming a three-ply tube with the fabric inserts, the thickened tread being afterward applied.

Similar reference numerals refer to similar parts throughout the several figures.

In Figure 1 I show the layer of rubber 6, having the grain lengthwise of the strip upon which is placed the layer 7 with the grain running transversely of the strip and finally the third layer 8 having the grain running longitudinally of the three strips, the same being formed into a tube, as shown at 9, by rolling upon the pole 10, to produce throughout the entire body of the tube three plys or layers, the central one of which has the grain running transversely while the two outer layers have the grain running longitudinally.

In Figure 2 I show the layer of rubber 11, having the grain lengthwise and which layer is of sufficient width to encircle the pole twice, while laid on the same properly positioned is the layer of rubber 12, part of which is broken away at 12ᴬ, and which second layer has the grain transversely, so that when rolled upon the pole the grain in the several layers of rubber will have the same relationship, as shown in Figure 1.

In Figure 3 the same construction is shown as in Figure 1, with the addition of the strips of fabric 14 and 14ᴬ placed upon opposite sides of the strip of rubber 7, in such position as to be in overlapping formation in the tube wall, the lowest strip 14ᴬ being shown in its relation to the layers of rubber 6 and 7 extending beyond the edge of the sheet 7, which is broken away at 15.

In Figure 4 is shown the layer of rubber 11 having the layer 7 positioned thereon showing also the fabric strips 14 and 14ᴬ properly located on the strip 7, as shown in Figure 3.

In Figure 5 is shown the layer of rubber 11 having superposed thereon properly positioned the strip 7 which in turn has properly placed on opposite sides of the same the strips of fabric 14 and 14ᴬ and 16 and 16ᴬ in overlapping formation and in such position that when rolled in the tube there will be one series on the rim-side and the other series oppositely disposed on the tread-side of the finished tube, the series 16 and 16ᴬ being used with a thickened tread for a puncture proof tube.

I do not confine myself to the right angled relation of the different lamina of rubber, as shown in the drawings, but the same may be in diagonal relation and variations also may be made as to the number and position of the plies, as may be desired. The chief point is to vary the direction or intersectional relation of the grain in the several plies to insure an elastic opposition or yielding reinforcement therebetween.

I have thus provided a convenient means for producing a tube in which the resultant structure will be substantially uniform in elasticity under strains applied in any and all directions, and therefore will be more efficient in resisting the various strains which may be applied to it, regardless of the relative degrees of stress which may be encountered under different conditions of use and notwithstanding the fact that the strains may be evenly distributed longitudinally and transversely, as well as diagonally of the sheet in the plane or parallel with the area thereof.

Variations and modifications as to the details of the above process may be adopted without departing from the spirit of my invention.

I claim:—

1. The method of producing multi-ply fabrics for tire tubes re-enforced with strips of textile fabric which consists in disposing the outermost and innermost layers of rubber in contact with the surfaces of an adjacent series of embedded fabric strips with the grain of the rubber in parallelism with the line of direction of the fabric strips while the grain of an intermediate layer of rubber between opposed surfaces of two series of fabric strips is in angular relation to the line of direction of said fabric strips, substantially as set forth.

2. The method of producing a re-enforcement for inner tubes which consists in applying fabric strips in overlapping relation on opposite sides of a prepared layer of rubber and positioning the said layer and fabric on a sheet of rubber having the grain running longitudinally of the tube then rolling the same into a tube and vulcanizing.

3. The method of producing a re-enforced inner tube which comprises applying protecting strips of fabric in overlapping relation to a layer of rubber of a width sufficient to go once round the pole and having the grain in angular relation to the pole, positioning the same with light pressure on a sheet of raw rubber of a width sufficient to form two wraps round the pole and having its grain in parallel relation to the pole, rolling into a tube and vulcanizing.

4. The method of making re-enforced rubber fabric comprising uniting to opposite sides of a sheet of rubber series of strips of textile fabric extending at an angle to the grain of the sheet, individual strips at one side being in overlapping relation to strips at the other side, and the strips in each series being parallel, substantially as set forth.

5. The method of making multi-ply re-inforced fabrics comprising interposing a series of fabric strips between a ply of rubber having its grain parallel to said strips and a layer having its grain at an angle to said strips and incorporating the compound strip into a tire with the first-named rubber sheet forming an outer layer of the tire and the second sheet an intermediate layer, substantially as set forth.

6. The method of making multi-ply reinforced rubber fabrics comprising interposing a series of fabric strips between a sheet of rubber having its grain parallel to said strips and a sheet having its grain at an angle to said strips and incorporating the compound strip into a tire with one of said rubber sheets forming an outer layer of the tire and the other sheet an intermediate layer, substantially as set forth.

In testimony whereof, I hereunto affix my hand, this 9th day of November, 1918.

ALBERT ENNIS HENDERSON.